United States Patent
Allasia et al.

(10) Patent No.: US 7,349,341 B2
(45) Date of Patent: Mar. 25, 2008

(54) PROCEDURE FOR SORTING FLOWS IN A TRANSPORT NETWORK CARRYING CIRCUIT DATA FLOWS

(75) Inventors: Andrea Allasia, Turin (IT); Andrea Giancola, Turin (IT); Gianluca Vaccarone, Turin (IT); Giuseppe Ferraris, Turin (IT)

(73) Assignee: Telecom Italia S.p.A., Milan (IT)

( * ) Notice: Subject to any disclaimer, the term of this patent is extended or adjusted under 35 U.S.C. 154(b) by 717 days.

(21) Appl. No.: 10/508,069

(22) PCT Filed: Feb. 27, 2003

(86) PCT No.: PCT/EP03/01983

§ 371 (c)(1), (2), (4) Date: Sep. 15, 2004

(87) PCT Pub. No.: WO03/079592

PCT Pub. Date: Sep. 25, 2003

(65) Prior Publication Data

US 2005/0141433 A1   Jun. 30, 2005

(30) Foreign Application Priority Data

Mar. 15, 2002 (IT) .................. TO2002A0226

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/50 | (2006.01) |

(52) U.S. Cl. ...................... 370/235; 370/376
(58) Field of Classification Search ............ None
See application file for complete search history.

(56) References Cited

U.S. PATENT DOCUMENTS

| 4,843,606 A | 6/1989 | Bux | |
|---|---|---|---|
| 2003/0035173 A1* | 2/2003 | Byers et al. | 359/135 |
| 2003/0112831 A1* | 6/2003 | Williams | 370/535 |
| 2004/0028071 A1* | 2/2004 | Gehring et al. | 370/442 |

FOREIGN PATENT DOCUMENTS

WO    36 402    10/1997

* cited by examiner

Primary Examiner—Kwang Bin Yao
Assistant Examiner—Ju-Tai Kao
(74) Attorney, Agent, or Firm—Andrew Wilford

(57) ABSTRACT

A procedure for sorting a plurality of circuit data flows (7, 8, . . . ) located, according to an initial configuration, in a plurality of sets of slots (space, time, frequency or wavelength) in a transport sub-network, comprising the following steps:—calculating a theoretical configuration in which flows are optimised in terms of occupied band by applying a theoretical flow routing algorithm; on the basis of the theoretical configuration defined above, exchanging the position of the flows in the sub-network slots to obtain an optimal arrangement which minimises the occupied slots; flows whose position corresponds to the position assumed by the flows in the initial position are identified to reduce the number of exchanges; defining and implementing a minimum shift sequence of single flows needed to shift each single flow from an initial position occupied in the initial flow configuration to a final position corresponding to the position assumed by the flow in the optimal slot set arrangement.

12 Claims, 3 Drawing Sheets

(a)

| from node | to node | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| X1 | X2 | 1 | 2 | 3 | 4 | 5 | 6 | 7 | 8 | 9 | 10 | 11 | 12 |  | 13 | 14 | 15 |
| X2 | X3 |  |  |  |  |  |  |  |  | 17 |  | 18 |  |  | 13 |  | 15 |
| X3 | X4 |  |  |  |  |  |  |  |  | 17 |  |  |  |  |  |  |  |
| X4 | X5 | 22 |  |  |  | 5 |  | 7 |  | 25 | 10 |  | 12 | 28 |  |  |  |
| X5 | X6 | 29 | 2 |  | 30 | 5 | 32 | 7 | 34 |  | 10 | 36 | 12 | 28 | 39 |  |  |
| X6 | X1 | 1 | 2 | 3 | 30 | 5 |  | 7 | 8 | 9 | 10 | 36 | 12 | 28 | 39 |  |  |

(b)

| from node | to node | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| X1 | X2 | 13 | 15 | 4 | 6 | 11 | 14 | 3 | 8 | 9 |  |  |  |  |  |  |  |
| X2 | X3 | 13 | 15 | 5 | 7 | 1 | 10 | 12 | 17 | 18 |  |  |  |  |  |  |  |
| X3 | X4 |  |  | 5 | 7 | 1 | 10 | 12 | 17 | 2 |  |  |  |  |  |  |  |
| X4 | X5 | 22 | 25 |  | 28 | 1 |  |  |  | 2 |  |  |  |  |  |  |  |
| X5 | X6 | 30 | 36 | 39 | 28 | 1 | 29 | 32 | 34 | 2 |  |  |  |  |  |  |  |
| X6 | X1 | 30 | 36 | 39 | 28 |  |  | 3 | 8 | 9 |  |  |  |  |  |  |  |

(c)

| from node | to node | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| X1 | X2 | 13 | 9 | 3 | 14 | 11 | 6 | 4 | 8 | 15 |  |  |  |  |  |  |  |
| X2 | X3 | 13 | 18 | 12 | 10 | 1 | 7 | 5 | 17 | 15 |  |  |  |  |  |  |  |
| X3 | X4 |  | 2 | 12 | 10 | 1 | 7 | 5 | 17 |  |  |  |  |  |  |  |  |
| X4 | X5 | 22 | 2 |  |  | 1 | 28 |  |  | 25 |  |  |  |  |  |  |  |
| X5 | X6 | 30 | 2 | 32 | 29 | 1 | 28 | 39 | 34 | 36 |  |  |  |  |  |  |  |
| X6 | X1 | 30 | 9 | 3 |  |  | 28 | 39 | 8 | 36 |  |  |  |  |  |  |  |

Fig. 2

PROCEDURE FOR SORTING FLOWS IN A TRANSPORT NETWORK CARRYING CIRCUIT DATA FLOWS

TECHNICAL FIELD

The invention refers to transport networks carrying circuit data flows, of the synchronous and asynchronous type, employing either space, time, frequency or wavelength multiplexing, and specifically refers to a procedure for sorting circuit data flows in a sub-network.

BACKGROUND ART

As known, data are transmitted in TDM (Time Division Multiplexing) transport networks in time windows or sets of slots (called "time slots") whose length is fixed, each of which contains one or more circuit data flows defined by the implemented protocol. Networks of this kind include, for example, SDH (Synchronous Digital Hierarchy) or SONET (Synchronous Optical Network) networks. The term "slot" therefore means "time interval" in this case.

In WDM (Wavelength Division Multiplexing) networks, data are transmitted on different wavelengths $\lambda_i$, which replace the multiplexing time slots and consequently may be called "λ-slots". Similarly, SDM (Space Division Multiplexing) or FDM (Frequency Division Multiplexing) networks can be implemented, in which case the concept of slot is associated to intervals of space or frequency. Specifically, FDM technology was implemented in the past before TDM technology was developed.

The invention refers to all types of networks based on the concept of slot described above. Reference will be made in the description that follows to TDM (SDH and SONET) and WDM networks considering their current popularity.

From a technical point of view, time slots in SDH and SONET networks and λ-slots in WDM networks can be considered equivalent. They are both "containers" in which data are transmitted, regardless of the actual physical implementation of the network.

Each transport network, SDH, SONET or WDM, can comprise various sub-networks, e.g. ring networks or meshed sub-networks, all employing the same transmission protocol.

When a circuit data flow set to be sold to a customer is created and established for operation, the slots forming the sub-network (time slots for SDH or SONET, λ-slots for WDM) are allocated to each circuit according to the situation of the network at the time; the situation is randomly determined by the incoming requests (according to the typical criteria of the network operator). In general, the aim is to optimise the total occupied band to minimise network implementation investments. Calculation algorithms have been developed for this purpose to optimise sub-network load and reduce band occupation. The traffic demand to be carried by the network must be entirely defined beforehand to work these theoretical algorithms, which in practice is impossible.

For example, a routing optimisation algorithm for SONET/SDH ring sub-networks is described in the publication HU-GON KIM, DONG-WAN TCHA, Optimal Load Balancing on Sonet Bidirectional Rings, Dankook University, July 1996.

The algorithm described in this publication is very useful for calculating optimal distribution of flows given a known demand, e.g. for programming a new ring sub-network. The biggest problem, on the other hand, to be faced when optimising a sub-network which is already operational in terms of occupied band, is how to change circuit configuration to implement the optimised configuration without disrupting the service, with minimum effects perceived by customers.

Flows are often untidy and irregular in a sub-network that has been working for some time due to flow allocation changes which inevitably occur in the course of time. For example, the allocated flows are released and "gaps" in the slot allocation map are formed when the resources allocated to a customer are cleared following cancellation of contracts. These gaps are often employed for smaller flows and even smaller gaps are created, which are even more difficult to use in the future. This effect in the middle term progressively worsens the ratio between the band effectively occupied by data in the sub-network and the total available band of sub-network, making the configuration of new flows in the sub-network effectively impossible.

Procedures for the temporary or definitive re-allocation of time slots in a TDM network are also known, e.g. the procedure illustrated in document WO 97/36402.

Despite referring to a switched network, this patent describes a procedure for shifting one or more time slots from a primary node to a temporary node and then re-allocating the time slots back to the primary node. This procedure is used to deal with the unexpected request for resources on the primary node by one or more customers and is used to temporarily allocate some time slots to an adjacent secondary node. The document shows how it is possible to work on time slot allocation, by shifting and exchanging them, without incurring excessive disruption for customers.

The object of this invention is to propose a procedure for dealing with the problem of how to optimise the band occupied by a plurality of circuit data flows in a transport sub-network while keeping the network running and causing the least possible disruption to customers for each single flow.

This and other objectives are obtained by means of an optimisation procedure and corresponding management device as illustrated in the annexed claims.

SUMMARY OF THE INVENTION

Advantageously, according to the invention, a flow sorting procedure is applied to reduce the occupied band and release a plurality of time slots, which would otherwise be occupied, for new customers.

In this way, when a sub-network is apparently saturated because there is no space for allocating a new data flow, the procedure described herein may be applied to optimise the band occupied by the current flows and possibly sort the sub-network to create space for the new flows. The result is a procedure for optimising the band employed by the flows configured on the sub-network which preserves the theoretical qualities of an optimal routing algorithm combining the possibility of minimising the number of operations required to reach this condition.

BRIEF DESCRIPTION OF DRAWINGS

Additional characteristics and advantages of the invention in its preferred form of embodiment will now be described, by way of example only, with reference to the annexed drawings wherein:

FIG. 2*a* is a table schematically illustrating an initial (non optimised) flow situation in a ring sub-network;

FIG. 2*b* is a table schematically illustrating the theoretical distribution of flows in the ring sub-network in FIG. 2*a*, after applying a theoretical routing algorithm;

FIG. 2*c* is a table schematically illustrating the final distribution of flows in the ring sub-network in FIG. 2*a*, after applying a sorting procedure according to the invention;

DETAILED DESCRIPTION OF THE PREFERRED EMBODIMENTS

The following detailed description illustrates a flow sorting procedure in a transport network ring sub-network carrying circuit data flows. The sub-network is schematically shown as a set of slots (which are time, spatial, frequency or wavelength intervals between pairs of linked sites). Specifically, the illustrated procedure can be applied to sorting SDH/SONET (Time Division Multiplexing) type networks and WDM (Frequency Division Multiplexing) type networks. The term "slot" will be used to indicate "time slots" in the case of SDH/SONET networks and "λ-slots" in the case of WDM networks.

Similarly, the invention can be applied to networks in which data flow multiplexing is obtained through either space division (SDM, Space Division Multiplexing) or frequency division (FDM, Frequency Division Multiplexing), in which case the term "slot" will be associated to space and frequency intervals, respectively.

The ring sub-network may implement MS-SPRing technology (OMS-SPRing for WDM networks). The procedure may be applied in general to any sub-network which may also not be ring structured (e.g. meshed or mixed meshed-ring topologies); flows may be protected or not.

Figures 1, 3, 4, 5:
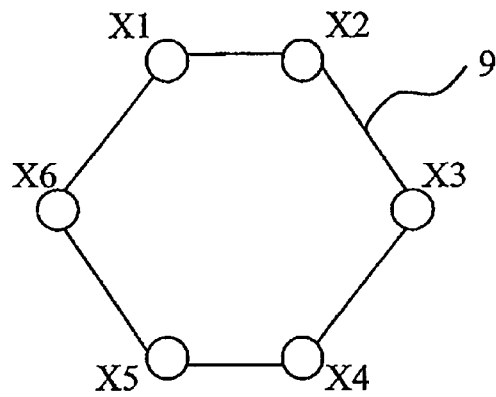
FIG. 1 is a logical diagram of a ring transport sub-network.
FIGS. 3, 4 and 5 schematically illustrate how the sorting procedure according to the invention is applied, for example on a simplified sub-network.

With reference to FIG. 1, an example of sub-network on which to apply the invention is a ring essentially consisting of six nodes, geographically placed in six different locations called X1, X2, X3, X4, X5, X6 in the figure, reciprocally connected by optical fibres or other transmission medium 9.

The logical diagram of the ring shown in FIG. 1 consists of a slot matrix (like that shown in FIGS. 2*a*, 2*b* and 2*c*) where the rows indicate multiplexed slots (e.g. from 1 to 16) according to the particular transmission protocol and the columns 6 indicate the slots with the same transmission index which can be exploited to configure the circuits (sets of slots with the same numeric code) between the various locations reached by the ring.

The flows are identified inside the table by a reference index, i.e. a number written inside each of the boxes allocated to a certain flow. For example, boxes 7*a* and 7*b* are allocated to flow 9 which occupies the set of slots 9 in the sections X6-X1 and X1-X2, while boxes 8*a* and 8*b* are allocated to flow 15 which occupies the set of slots 16 in the sections X1-X2 and X2-X3.

It is immediately apparent that the flows in the ring network in FIG. 2*a* are distributed untidily and partially occupy all sixteen sets of slots 6. The sixteen sets of slots occupied by the flows form a total of 16·6=96 available slots, of which up to 44 remain "free" between flows (blank boxes in the table). This means that despite being all engaged, only 54% of the slots 6 in the ring are actually occupied; sub-network use is therefore not very efficient and collocating new flows in the ring may be difficult, if not impossible.

The band occupied by the currently allocated flows can be reduced and a certain number of slot sets may be entirely released, as illustrated in detail below, by applying a flow sorting procedure to the slot sets in the initial conditions of the sub-network as shown in FIG. 2*a*.

The flow sorting procedure is essentially based on the following sequence of operations:

Calculating theoretical optimal flow routing with the objective of minimising "gaps" (band optimisation process) to obtain the configuration illustrated, for example, in FIG. 2*b*, starting from instantaneous filling data of a ring sub-network. A theoretical optimisation algorithm for optimising traffic in known demand conditions is used to obtain this result, e.g. the algorithm described in the aforesaid publication GON KIM, DONG-WAN TCHA, Optimal Load Balancing on Sonet Bidirectional Rings, Dankook University, July 1996;

Comparing the original data and the theoretical condition calculated in the previous step to define an optimal transition sequence and obtain an optimal final condition with the constraint of minimising the number of flow position variations.

The procedure hereof determines a shifting sequence which minimises the use of slot sets external to the ring and reduces, when possible, the number of shifts of each flow.

For example, it would not be problem if the destination slot set of a single flow, called A for example were free; on the other hand, if the destination slot were also only partially engaged by another flow, called B, B would have to be shifted before A and so on. An order can be formed by scanning the flows in the ring. The shifting process may proceed seamlessly, one flow at a time, by respecting the order.

A slot will only need to be temporarily shifted onto a spare slot set (internal or external to the ring), when the order becomes a loop, e.g. A>B>C>A; all the other flows will be shifted and finally the flow shifted onto the spare slot will be moved back to its destination.

A spare slot set can be a set of free slots in the same sub-network or a set of slots located in different systems which share the same infrastructure, cable or installation site. During this phase, one or more flows may need to be temporarily re-routed off the sub-network and shifted back inside the ring. However, it is more cost-effective to sort the flows in the ring without shifting temporarily onto other rings or alternatively to minimise such shifts.

We will now analyse the sorting procedure step-by-step.

The first step in the procedure consists in calculating an optimal theoretical flow configuration for the occupied band by means of the theoretical optimal flow routing algorithm. This configuration is illustrated in FIG. 2*b*, which clearly shows that all the previously allocated flows in the ring have been compacted into the first nine slot sets of the sub-network and the last seven are entirely free. The routing criterion was changed for some flows, e.g. flow 1 and flow 10, from minimum to complementary or vice versa, to occupy some slots which could not otherwise be employed.

The nine sets of slots occupied by the flows contain a total of 9·6=54 slots, of which only 8 are "free" between flows (blank boxes in the table). This means that up to 85% of the slots are actually occupied.

The second step consists in exchanging the slot sets in the theoretical flow configuration shown in FIG. 2*b* and calculated in the previous step to obtain a new arrangement of the slot set in which the number of flows is maximised and whose position corresponds of the position assumed by the flows in the initial configuration in FIG. 2a. The result of these exchanges is illustrated in the table in FIG. 2c and is also the final objective of the sorting procedure.

The configuration shown in FIG. 2c is equivalent, as far as the occupied band is concerned, to the configuration in FIG. 2b. The flows are distributed over 9 slot sets containing a total of 9·6=54 slots. Also in this case, only 8 slots remain "free" between flows (blank boxes in the table) and 85% of the slots is actually occupied by the flows.

To better understand the steps of the sorting procedure, we will now consider a very simplified sub-network (e.g. illustrated in FIG. 3). The table in FIG. 3 contains five rows, corresponding for example to the five sections of a ring, and six columns corresponding to six sets of slots. This example is provided only to illustrate how the slot sets are exchanged and the flows are shifted.

We will now assume that the configuration illustrated in FIG. 4 is obtained by applying a theoretical optimal flow routing algorithm, corresponding to the first step in the procedure.

The configuration shown in FIG. 5, where all the slot sets in the table in FIG. 4 have been exchanged according to a set of rules which will be described below, is obtained by applying the second step.

Specifically, the second step consists of the following phases:

a) Creating a first table in which each row shows for each flow whose position differs from the initial theoretical flow configuration, a reference index associated to said flow and a pair of values indicating the source slot set and the destination slot set, respectively.

For example, for flow F, the string "F (5,1)", which means that flow F has slot set S as source (FIG. 3), and slot set 1 as destination (FIG. 4), will be written in a first row of the table. The string "D (1,2)" will be used for flow D, and so on for all the other flows whose position changes.

b) Creating, a list showing all pairs of values present at least once in said first table, sorting (in decreasing order) said pairs of values according to the number of times that each pair appears in said first table.

The most frequent shifts will be visible in the way.

c) Exchanging the slot sets corresponding to the values indicated by the first pair in said list from the top and deleting the first pair and all the other pairs from the list in which either one or the other of the values contained in the first pair occur.

d) Repeating step c) until all the pairs in the list are finished.

The slot steps are exchanged during these last two phases starting from those corresponding to the most frequent shifts.

The third step in the procedure consists in defining and performing a minimum shift sequence concerning the single flows needed to shift each single flow from an initial position occupied in the initial flow configuration (FIG. 3) to a final position (FIG. 5) corresponding to the position shown by the flow in the optical slot set arrangement. The operations performed in this third step, referred to the simplified case illustrated in figures from 4 to 6, are summarised in FIG. 6 to which reference is made below.

The following operations are required to implement the third step:

e) Creating a second table showing flow interdependence. See table 10a in FIG. 6.

f) Selecting a first flow from those that must be shifted.

We will take flow A as an example.

g) Adding a number of rows equal to the number of flows which occupy the final position of said flow (also partially) in table 10a for the selected flow A and writing a pair of reference indexes in each row indicating the selected flow and the flow occupying the final position, respectively, or, if said final position is free, a pair of reference indexes in which the first index indicates the selected flow and the second index conventionally shows that the final position is free.

In the example shown, considering initially flow A, for example, the pair (A, C) has been written in the table because flow A must be moved before flow C.

h) Repeating step g) recursively selecting one by one the flows which occupy the final position of the previously selected flow until such final position is either free or occupied by a previously selected flow.

The pair (C, B) is therefore written in table 10a indicating that flow C requires the precedence of flow B and finally (B, A) because flow B requires the precedence of flow A.

i) Checking in the second table the presence of circular dependence between two or more flows; if such occurrence is present, starting to shift one of the flows in the circular dependency onto a free spare slot set and for all pairs in the second table having as the value indicative of the final position of the flow the index of the shifted flows, replacing the index with a value conventionally indicating that the final position is free, e.g. 0 (zero).

A circular dependency is present (A, C)-(C, B)-(B, A) in table 10a. Consequently, the flow A is shifted onto a spare slot set (this operation is indicated by reference 20a in FIG. 6) and table 10a is updated. The result is table 10b in which flow A is replaced by 0 conventionally indicating that the final position of flow B is now free.

j) Searching the second table for pairs whose index corresponds to the conventional value (zero) showing that the final position is free and proceeding for each of the pairs shifting the corresponding flow onto the corresponding final position and deleting the row corresponding to said pair from the table; for all pairs in the second table whose final position flow identification value corresponds to the identification index of said shifted flow, replacing said index with a value 0 conventionally indicating that the final position is free.

Figure 6:
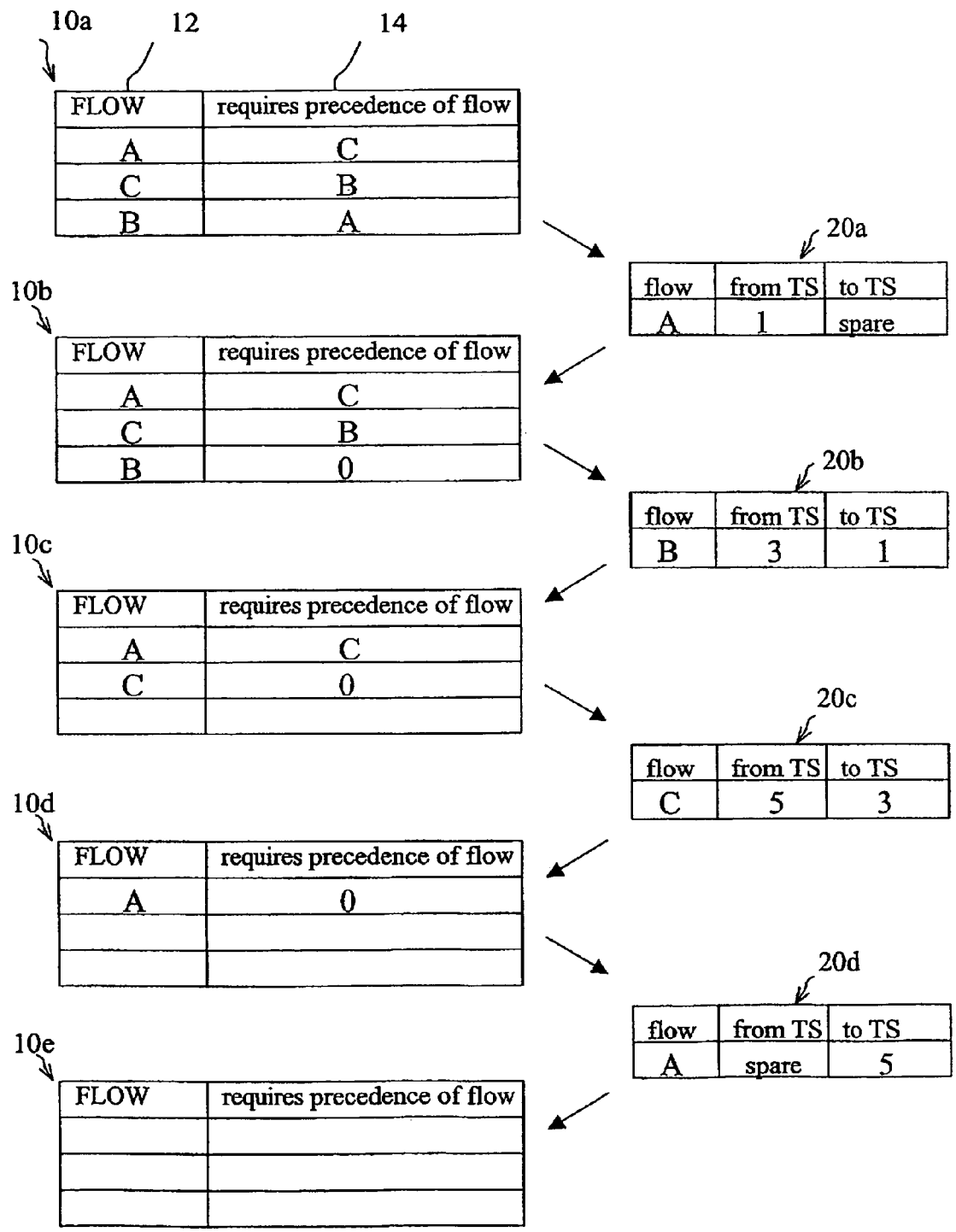
FIG. 6 illustrates some steps in the sorting procedure referred to the simplified sub-network example shown in FIG. 3.

The operation indicated by reference 20b in FIG. 6 is therefore carried out, shifting flow B from time slot 3 to time slot 1 and updating the table by deleting the row (B, 0) and changing pair (C, B) to (C, 0), see table 10c.

k) Repeating steps i) and j) until said second table is empty.

This operation entails shifting flow C from time slot 5 to time slot 3, see operation 20c in FIG. 6, updating the table by deleting row (C, 0) and changing pair (A, C) to (A, 0), see table 10d, and finally shifting flow A from the spare time slot to the final position, i.e. time slot 5, operation 20d.

At this point, the order table 10e will be empty and the next operation can be started.

l) Selecting a new flow from those which must be shifted and repeating step g) and the following steps.

At this point of the procedure, in the simplified example, the flows have all been shifted and the final configuration shown in FIG. 5 has been reached.

It is important to note that the sorting procedure previously described with reference to a ring sub-network must follow a preliminary evaluation of data provided in documentation. The evaluation must be repeated employing the punctual data provided by the network manager responsible for physical cross-connections for implementation.

Defining whether it is possible to physically sort the flows and consequently plan the sequence of transitions for minimising the number will only be possible following this new evaluation.

In operative terms, the sorting procedure is implemented by a device for centralisation management of the transport network which supports and closely interacts with the network manager as explained below with special reference to a ring sub-network implementing MS-SPRing technology.

In the case of a ring sub-network implementing MS-SPRing technology, the previously described procedure can be implemented, for example, by overlapping an SNCP protection employing some of the previously released time slots.

This procedure involves routing SNCP protection branches onto free time slots in the ring. Consequently, two or three time slots may need to be preventively released before starting the procedure. Furthermore, before starting the procedure, there must be no alarms on the ring causing MS-SPRing protection to switch.

The steps needed to implement the method are listed below:

1) Routing and activating flow SNCP protection branch as shown in the migration procedure by network manager.

2) Overriding SNCP protection exchange by means of the management system.

3) Deactivating flow protection branch and removing routing.

The SNCP protection branch is routed onto the same multiplexed sections of the working branch but on a different AU4 (Administrative Unit Level 4).

Additionally, these operations must be carried out on all flows in the ring involved in the previous sorting algorithm (they can be run several times on the same flow).

The method requires 25-40 shifts in a fully loaded ring. MS-SPRing protection can be up for the entire duration of the migration (flow reliability is not affected).

At least 2-3 time slots must be freed in the entire tool to carry out the exchange sequence. Consequently, either the sorting procedure is carried out before the ring is ended or some flows are temporarily shifted.

The resulting band saving is in the range of 20% of the installed structure. The punctual results of the cases taken into consideration during experimental phases show that peaks of 40% can be obtained according to the type of traffic on the ring (traffic on directives, balanced, diagonal, unbalanced).

Punctual "design" of the sorting operation is needed to apply the procedure according to the real configuration of the flows on the ring; this protects the quality/reliability level of the flows concerned by the sorting operation.

The procedure according to the present invention can be implemented as a computer program comprising computer program code means adapted to run on a computer. Such computer program can be embodied on a computer readable medium.

The invention claimed is:

1. A procedure for optimizing the band occupied by a plurality of circuit data flows located, according to an initial configuration, in a plurality of sets of slots of a transport network, by sorting said flows inside the same sets of slots, said procedure comprising the steps of:

calculating, with a theoretical optimal flow routine algorithm, a theoretical configuration of the flows contained in said initial configuration, which is optimized as regards the occupied band;

exchanging the sets of slots of said theoretical flow configuration to obtain an optimal arrangement of said sets of slots, the number of flows whose position corresponds to the position assumed by the same flows in said initial configuration being maximized;

defining a minimum shift sequence of single flows needed to shift each single flow from an initial position occupied in said initial flow configuration to a final position corresponding to the position assumed by the same flow in said optimal slot set arrangement;

implementing said minimum shift sequence of single flows, thus obtaining a flow configuration with a band occupation equivalent to said theoretical flow configuration.

2. The procedure as defined in claim 1, wherein said exchange phase between the sets of slots is implemented by the following steps:

a) creating a first table in which each row gives, for each flow whose position in the theoretical flow configuration differs from the initial configuration position, a reference index associated with said flow and a pair of values indicating the source slot set and the destination slot set respectively;

b) creating a list of all the pairs of values present at least once in said first table, sorting in decreasing order said pairs of values according to the number of times that each pair appears in said first table;

c) exchanging the slot sets corresponding to the values indicated by the first pair in said list from the top, and deleting from the list said first pair and all the other pairs in which either one or the other of the values contained in the said first pair appear;

d) repeating step c) until all the pairs in said list are finished.

3. The procedure as defined in claim 1 wherein said transport network includes at least one set of spare slots normally unoccupied by a flow, and in wherein said phases that define a minimum shift sequence of the single flows and that implement said sequence are implemented with the following steps:

e) creating a second table showing flow interdependence;

f) selecting a first flow from those that must be shifted;

g) adding in said second table, for said selected flow, a number of rows equal to the number of flows that occupy, even partially, the final position of said selected flow, writing a pair of reference indexes showing the selected flow and the flow occupying the final position in each of said rows, or in the event that said final position is free, a pair of reference indexes in which a first index indicates the selected flow and a second index conventionally shows that the final position is tree:

h) repeating step g) selecting the flows that occupy the final position of the flow selected previously, one at a time and recursively, until such final position is free or is occupied by a flow that has already been previously selected;

i) checking in said second table the presence of a circular dependence between two or more flows, if such occurrence is present, starting to shift one of the flows in said circular dependency onto a free spare slot set and for all pairs in said second table having as a value indicative of the final position of the flow the index indicative of said shifted flow, replacing said index with a value conventionally indicating that the final position is free;

j) searching within said second table for pairs having as index indicative of the final position of the flow said conventional value indicating that the final position is free, and proceeding, for each of said pairs by shifting the corresponding flow onto the corresponding final position and deleting the row corresponding to said pair from the same table; for all pairs of said second table having as the value indicative of the final position of the flow the index indicative of said shifted flow, replacing said index with a value conventionally indicating the final position is free;

k) repeating steps i) and j) until said second table is empty;

l) selecting a new flow from those which must be shifted and repeating step g) and the following steps.

4. The procedure as defined in claim 1 wherein said sets of slots in which said flows are initially collocated are sets of slots of a first sub-network of said transport network.

5. The procedure as defined in claim 4 wherein said sets of spare slots are sets of slots of a second sub-network of said transport network.

6. The procedure as defined in claim 5 wherein said first sub-network and said second sub-network are ring networks.

7. The procedure as defined in claim 1 wherein said transport network is a network of the SDH or SONET type and said slots are time-slots.

8. The procedure as defined in claim 1 wherein said transport network is a WDM type network and said slots are X-slots.

9. The procedure as defined in claim 1 wherein said transport network is an SDM type network and said slots are space intervals.

10. The procedure as defined in claim 1 wherein said transport network is a FDM type network and said slots are frequency intervals.

11. A device for the centralized management of a transport network wherein said data are arranged in circuit data flows collocated in a plurality of sets of slots including a system for sorting said flows within said sets of slots, wherein said system uses a procedure for optimizing the band according to claim 1.

12. A computer-readable medium carrying program code that when executed performs all the step of claim 1.

* * * * *